US006942718B1

(12) United States Patent
Schmidt

(10) Patent No.: US 6,942,718 B1
(45) Date of Patent: Sep. 13, 2005

(54) ORIENTATION INSENSITIVE COMBINED LIQUID RESERVOIR AND GAS/LIQUID SEPARATOR

(75) Inventor: Jeffrey A. Schmidt, Longmont, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 29 days.

(21) Appl. No.: 10/355,830

(22) Filed: Jan. 31, 2003

Related U.S. Application Data

(60) Provisional application No. 60/353,470, filed on Jan. 31, 2002.

(51) Int. Cl.$^7$ .............................................. B01D 19/00
(52) U.S. Cl. ..................... 95/46; 95/241; 96/6; 96/155
(58) Field of Search .......................... 95/46, 241; 96/6, 96/155

(56) References Cited

U.S. PATENT DOCUMENTS

| | | | | |
|---|---|---|---|---|
| 4,080,288 A | * | 3/1978 | Pilson | 210/620 |
| 5,104,810 A | * | 4/1992 | Birbara et al. | 436/161 |
| 5,106,754 A | * | 4/1992 | Steele et al. | 436/146 |
| 5,439,587 A | * | 8/1995 | Stankowski et al. | 210/321.64 |
| 5,749,942 A | * | 5/1998 | Mattis et al. | 95/46 |
| 5,830,261 A | * | 11/1998 | Hamasaki et al. | 96/6 |
| 5,871,566 A | * | 2/1999 | Rutz | 96/6 |
| 5,888,275 A | * | 3/1999 | Hamasaki et al. | 96/6 |
| 5,931,349 A | * | 8/1999 | Yoo | 222/146.5 |
| 5,980,742 A | * | 11/1999 | Saitoh | 210/198.2 |
| 5,989,318 A | | 11/1999 | Schroll | 96/6 |
| 6,117,214 A | * | 9/2000 | Peter et al. | 96/6 |
| 6,242,119 B1 | | 6/2001 | Komura et al. | 429/17 |
| 6,258,154 B1 | * | 7/2001 | Berndt et al. | 96/6 |
| 6,537,356 B1 | * | 3/2003 | Soriano | 96/155 |
| 6,698,692 B1 | * | 3/2004 | Tichenor et al. | 244/135 R |

OTHER PUBLICATIONS

Holder, Donald W., et al., "Investigation into the Performance of Membrane Separator Technologies Used in the International Space Station Regenerative Life Support Systems Results and Lessons Learned," SAE Technical Papers, 31$^{st}$ International Conference on Environmental Systems, Jul. 2001, Orlando, Florida, SAE International.

Slavin, Thomas J., et al., "Permeable Membrane Experiment," SAE Technical Paper Series, 23$^{rd}$ International Conference on Environmental Systems, pp. 1-5, Jul. 1993, Colorado Springs, Colorado, SAE International.

* cited by examiner

Primary Examiner—Robert H. Spitzer
(74) Attorney, Agent, or Firm—Sheridan Ross P.C.

(57) ABSTRACT

In accordance with the present invention, a system for separating gas and liquid phases from a mixed phase system is provided. Furthermore, the present invention provides for the reliable separation of liquid and gas phases, regardless of the orientation of the system with respect to a gravitational field, and in low or zero gravity environments. The system of the present invention generally provides a reservoir having a variable volume that is formed from a gas permeable, hydrophobic, microporous, polymer material. Material confined within the reservoir is maintained under pressure, to expel any gases introduced to the interior of the reservoir as part of a mixed phase inlet stream. The liquid phase component of the mixed phase inlet stream may be removed from the reservoir through an outlet located within the reservoir volume.

24 Claims, 11 Drawing Sheets

US 6,942,718 B1

ORIENTATION INSENSITIVE COMBINED LIQUID RESERVOIR AND GAS/LIQUID SEPARATOR

CROSS REFERENCE TO RELATED APPLICATIONS

Priority is claimed from U.S. Provisional Patent Application No. 60/353,470, filed Jan. 31, 2002, entitled "ORIENTATION INSENSITIVE COMBINED LIQUID RESERVOIR AND GAS/LIQUID SEPARATOR," which is incorporated herein by reference in its entirety.

FIELD OF THE INVENTION

The present invention relates to the separation of liquids from gases in a mixed phase material. In particular, the present invention relates to the separation of liquids from gases at any orientation, and while providing a liquid reservoir.

BACKGROUND OF THE INVENTION

The separation of gas and liquid phases from a mixed phase material is useful in a variety of applications. One such application is in connection with fuel cells used for the production of electricity. For example, in a direct methanol fuel cell (DMFC) exhaust products, comprising $H2O(g)$, $H2O(l)$ and perhaps trace amounts of methanol recovered from the fuel cell stack cathode can be recycled to provide a makeup supply of $H2O(l)$. Also, excess amounts of liquid methanol, water and product $CO2$ removed from the anode of the fuel cell stack maybe separated to provide a recycled supply of methanol and water. However, because of the limitations of existing systems for separating gases from liquids in mixed phase systems, providing a truly portable direct methanol fuel cell has been problematic.

The separation of gases from liquids in mixed phase systems has traditionally relied on gravity. Accordingly, existing gas/liquid separators are generally incapable of being used in any orientation. Although "clunk tanks" are available for providing a supply of gas-free liquids at any orientation, such systems do not provide true mixed phase separation. Other methods for separating gases from liquids are incapable of providing a liquid reservoir in connection with an orientation-insensitive system.

With reference now to FIG. 1, a conventional passive gas/liquid separator 100 is illustrated. The separator 100 includes a gravity separation reservoir or recovery tank 104. A mixed gas/liquid phase inlet 108, in communication with the fixed interior volume of the reservoir 104, supplies the mixed phase material to the reservoir 104. Under the influence of gravity, the liquid phase 112 is accumulated in the sump 116 of the reservoir 104, while the gas phase 120 is allowed to escape through a top-mounted vent 124. A hydrophobic membrane 128 may be used to prevent the loss of liquid 112 from the reservoir 104 should the reservoir 104 become tipped or inverted. The liquid 112 may be withdrawn through an outlet 132 located in the bottom of the sump 116. The separator 100 is incapable of reliably separating the gas phase 120 from the liquid phase 112 of the material when the separator 100 is oriented such that the vent 124 is below the outlet 132, or when the separator 100 is in a zero or near zero gravity environment.

With reference now to FIG. 2, a second conventional gas/liquid separator 200 is illustrated. In the separator 200, a mixed gas/liquid phase material is introduced through an inlet 204 into a fixed volume 208 that comprises a planar microporous hydrophobic membrane 212 and a planar hydrophilic membrane 216. The gas phase of the mixed gas liquid phase material is removed from a gas phase accumulating volume 220 through an outlet 224. The liquid phase passes through the hydrophilic membrane 216 and is accumulated in a liquid accumulating manifold 228. The liquid phase is then passed from the manifold 228 to a reservoir 232 by an outlet 236. In order to prevent the accumulation of any remaining gas phase material in the reservoir 232, a gas vent 240 is provided. An outlet 244 is provided for removing the liquid from the reservoir 232. Accordingly, the reservoir 232 portion of the gas/liquid separator 200 is orientation-sensitive. Although a reservoir 232 could be implemented as an accumulator that allows for orientation variance, such an implementation would result in a device in which any gases residual in the reservoir 232 are trapped until they are drawn out with the liquid.

For the reasons set forth above, there is a need for a system capable of separating gases from liquids in a mixed phase material that is orientation-insensitive. Furthermore, there is a need for such a system that provides a reservoir for a liquid phase of such material that is integrated with the gas/liquid separator. Furthermore, there is a need for such a system that reliably provides true phase separation.

SUMMARY OF THE INVENTION

In accordance with the present invention, an orientation insensitive liquid reservoir combined with a gas/liquid separator is provided. Also disclosed is a method for separating a gas from a liquid that is insensitive to the presence or orientation of a gravitational field. The present invention allows for the reliable separation of liquids from gases while providing a variable volume reservoir for liquids.

In accordance with an embodiment of the present invention, a variable reservoir volume that is at least partially constructed from a gas permeable, hydrophobic membrane material is provided. An inlet to the variable volume reservoir admits a mixed phase material. An outlet having an opening that is in communication with the interior of the variable reservoir volume is also provided. Liquid contained in the variable reservoir volume is pressurized, to drive gas phase material from the reservoir through at least those portions of the reservoir formed from a gas permeable material. Accordingly, the variable reservoir volume functions as a liquid reservoir, in addition to a gas/liquid separator.

In accordance with an embodiment of the present invention, the opening of the outlet is positioned at or near the center of the reservoir volume. In accordance with another embodiment of the present invention, the opening of the outlet from the variable reservoir volume is covered by a hydrophilic material. The positioning of the opening of the outlet near the center of the variable reservoir volume and/or the use of a hydrophilic material across the opening can promote the reliability with which only the liquid portion of a liquid/gas phase material is provided to the outlet.

In accordance with an embodiment of the present invention, the variable reservoir volume is formed from a gas permeable material that is held between pressure plates that are biased to pressurize liquid held within the variable reservoir volume. In accordance with another embodiment of the present invention, the variable reservoir volume is formed from a tube of flexible gas permeable material with at least one end that is sealed about at least a first inlet, and at least one end that is sealed about at least a first outlet. The first and second ends of the variable reservoir volume are biased away from one another, to pressurize liquid held within the variable reservoir volume.

In accordance with still another embodiment of the present invention, the variable volume is formed using at least one sheet of gas permeable material forming one side of the variable reservoir volume. The distance of at least one side of the reservoir from a second side of the reservoir may be varied, to vary the volume of the reservoir. The first and second sides of the reservoir are biased towards one another to pressurize liquid held within the variable reservoir volume. The first and second sides of the reservoir may be interconnected to one another by a bellows or flexible seal.

In accordance with a further embodiment of the present invention, a method for separating the gas and liquid phases of a mixed phase material is provided. According to the method, a gas/liquid phase material is admitted to a variable volume reservoir. The method further includes pressurizing the contents of the variable volume reservoir, to drive the gaseous component of the mixed phase material through the gas permeable wall or walls of the variable volume reservoir. In accordance with an embodiment of the present invention, the liquid component remaining in the variable volume reservoir may be removed through an outlet positioned at or near the center of the variable volume reservoir.

In accordance with a further embodiment of the present invention, a method for separating a gas from a liquid is provided in which a first volume of a gas phase of a mixed phase material is separated from that material at a first orientation with respect to a gravitational field. The method further includes storing a second volume of a liquid phase of the mixed phase material in a reservoir at said first orientation with respect to the gravitational field. A third volume of the gas phase of the material is separated from the material at a second orientation with respect to the gravitational field, and a fourth volume of the liquid phase of the material is stored in the reservoir at a second orientation with respect to the gravitational field.

Additional advantages of the present invention will become readily apparent from the following discussion, particularly when taken together with the accompanying drawings.

DETAILED DESCRIPTION

In accordance with the present invention, a system for separating gas and liquid phases from a mixed phase system is provided. Furthermore, the present invention provides for the reliable separation of liquid and gas phases, regardless of the orientation of the system with respect to a gravitational field, and in low or zero gravity environments. The system of the present invention generally provides a reservoir having a variable volume that is formed from a gas permeable, hydrophobic, microporous, polymer film or membrane. Material confined within the reservoir is maintained under pressure, to expel any gases introduced to the interior of the reservoir as part of a mixed phase inlet stream. The liquid phase component of the mixed phase inlet stream may be removed from the reservoir through an outlet in communication with the interior of the reservoir volume.

Figure 1:
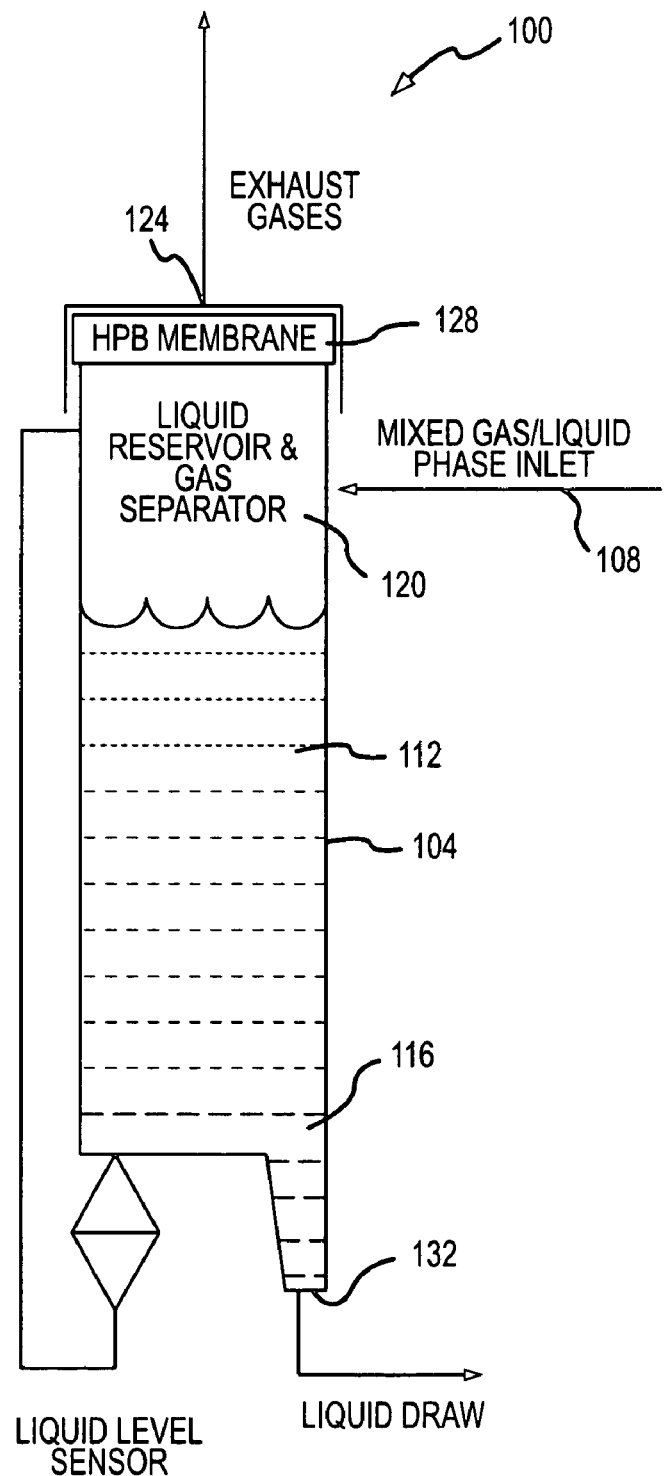
FIG. 1 is a schematic representation of a gas/liquid separator in accordance with the prior art.
Figure 2:
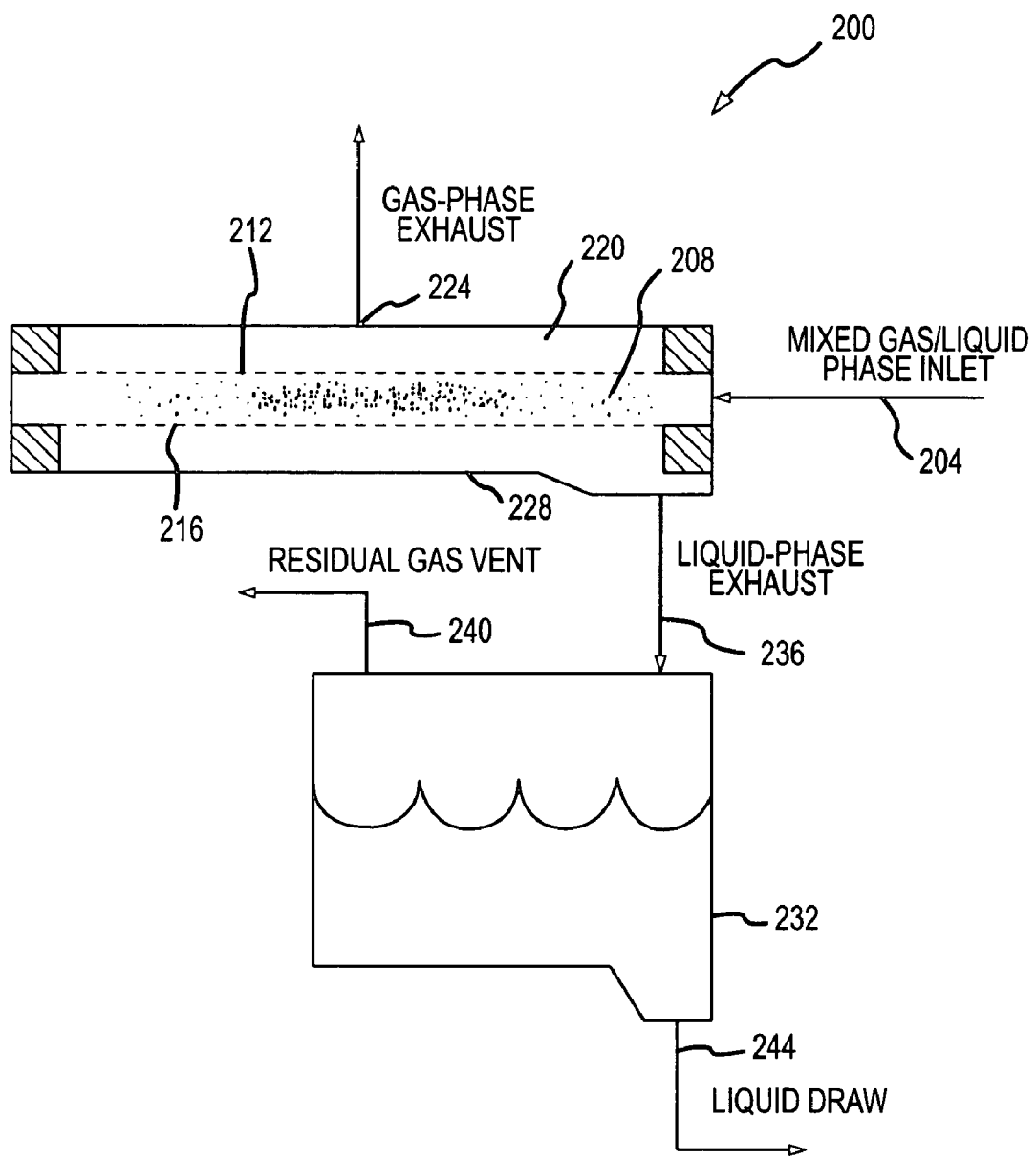
FIG. 2 is a schematic representation of another gas/liquid separator in accordance with the prior art.
Figure 3:
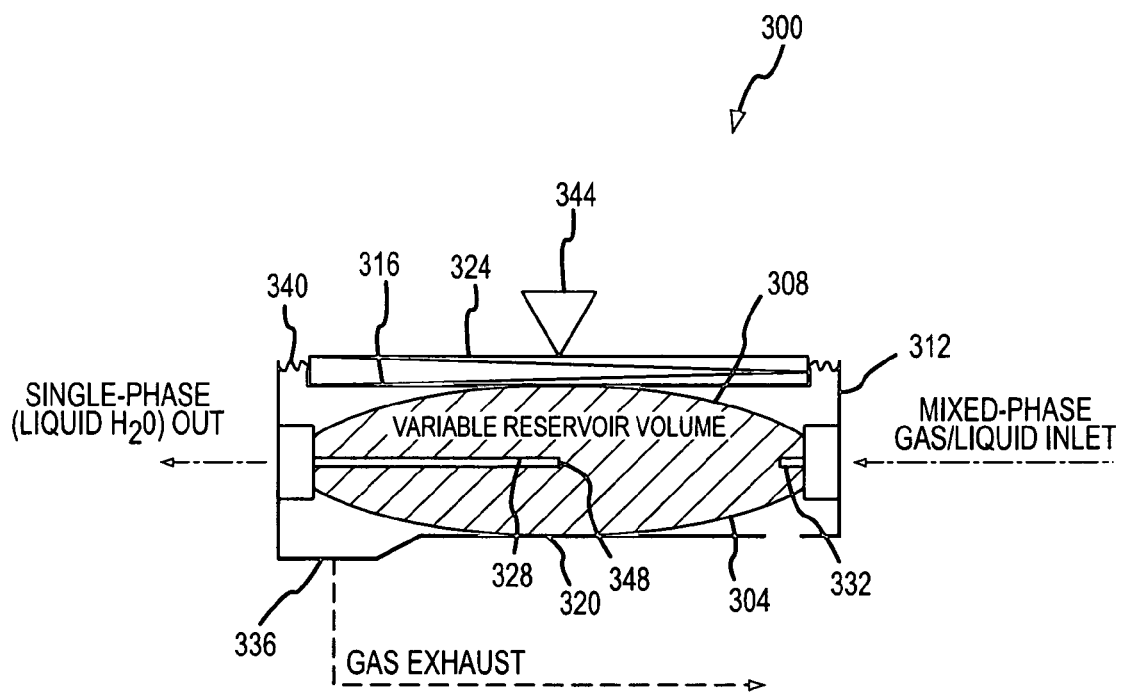
FIG. 3 is a schematic representation of an orientation insensitive gas/liquid separator in accordance with an embodiment of the present invention.

With reference now to FIG. 3, a gas/liquid separator 300 in accordance with an embodiment of the present invention is illustrated. In general, the separator 300 comprises a reservoir or bladder 304 having a variable volume constructed using a flexible, gas permeable, hydrophobic, microporous, polymer membrane 308. In addition, the separator 300 includes a reservoir compartment 312. The reservoir 304 is held between a movable support surface or pressure plate 316 and a fixed support surface or bearing surface 320 of the reservoir compartment 312. A biasing member or spring 324 acts against the pressure plate 316 to drive oat gas from the reservoir 304 through the permeable walls of the membrane 308. In accordance with an embodiment of the present invention, the spring 324 has a first end that is fixed in position with respect to the bearing surface 320 and a second end that biases the pressure plate 316 against the reservoir 304. The liquid phase of the mixed phase material is removed from the reservoir through a liquid outlet 328 having an opening 348 positioned at about the center of the variable volume of the reservoir 304. By so positioning the opening 348 of the liquid outlet 328, substantially gas-free liquid may be reliably supplied to the liquid outlet 328, regardless of the orientation of the separator 300.

The mixed phase material is provided to the reservoir 304 through one or more inlets 332. The inlets 332 may be located around a perimeter of the reservoir compartment 312. Gas collected in a volume defined by the reservoir compartment 312 and the pressure plate 316 may be removed through a gas exhaust vent 336. In accordance with another embodiment of the present invention, a plurality of gas exhaust vents 336 may be provided, located at various positions about the reservoir container 312. A bellows 340 may be provided for preventing gas from escaping the volume defined by the reservoir container 312 and the pressure plate 316 at the interface between the reservoir container 312 and the pressure plate 316. In accordance with a further embodiment of the present invention, a sensing device 344 may be provided for gauging the volume of liquid contained in the reservoir 304.

In accordance with an embodiment of the present invention, the membrane 308 comprises a polytetrafluoroethylene (PTFE) material. Other suitable materials include polyethersulfon; Nylon, 6; polyethylene; polypropylene; and acrylic copolymers. The PTFE or other material may be laminated with a woven polymer or other suitable material for strength. As an example, the membrane 308 may be fabricated using TETRATEX, available from Tetratec Corporation, a hydrophobic 1.5 micron expanded PTFE (e-PTFE) membrane bonded to TYPAR 3161L polypropylene, which is capable of separating air from water and CO2 from water/methanol solutions with very low backpressures. For example, an airflow of about 160 SCCM/CM2/inch water can be supported according to an embodiment comprising a TETRATEX membrane 308, while providing a water intrusion pressure of about 6 psig. These performance characteristics allow solutions of water and methanol, with methanol concentrations of up to about 90 percent, to be separated from entrained gases without liquid intrusion and passage through the membrane 308. As another example, expanded PTFE GORE-TEXO Olephobic membrane material from W. L. Gore & Associates, Inc. may be used. As a further example, a suitable membrane 308 may comprise microporous e-PTFE membranes without backings, available from suppliers such as W. L. Gore & Associates, Inc. and Zeus, Inc.

In operation, the mixed phase material, for example, the recirculated anode feed stock solution of methanol, water and CO2 gas in a direct methanol fuel cell, enters the reservoir 304 through the inlet 332. The pressure from the spring 324 drives the CO2 gas and some trace water and methanol vapor through the hydrophobic, porous membrane 308 that comprises the reservoir 304. Conceptually, the spring 324 keeps the walls of the reservoir 304 in contact with the liquid content of the reservoir 304, thereby excluding the gas. That is, the membrane 308 is forced to track the volume of the liquid. The gas is expelled from the reservoir 304 to the interior of the reservoir compartment 312. The gas is then removed from the reservoir compartment 312 through the exhaust port 336.

The opening 348 of the liquid pickup tube or outlet 328 is located in the center of the variable volume defined by the reservoir 304 so that geometrically the opening 348 is always surrounded by liquid, and so the opening 348 is located as far as possible from the porous membrane 308 forming the walls of the reservoir 304, where scavenging of the gas phase is actively occurring. By symmetrically supporting and pressurizing the reservoir 304 within the reservoir compartment 312, the separator 300 is capable of providing orientation insensitive operation (i.e. is capable of operation in any orientation with respect to a gravitational field or in a zero gravity environment). Aspiration of trace gases into the opening 348 of the liquid outlet 328 can be reduced or eliminated by directing the opening 348 of the outlet 328 away from the inlet 332, or by providing a hydrophilic filter at the opening 348 of the outlet 328 that excludes gases over preferred liquids. The separator 300 provides for the reliable separation of gas and liquid phases in an orientation insensitive manner, while simultaneously providing a reservoir for the resulting single-phase liquid.

Figure 4:
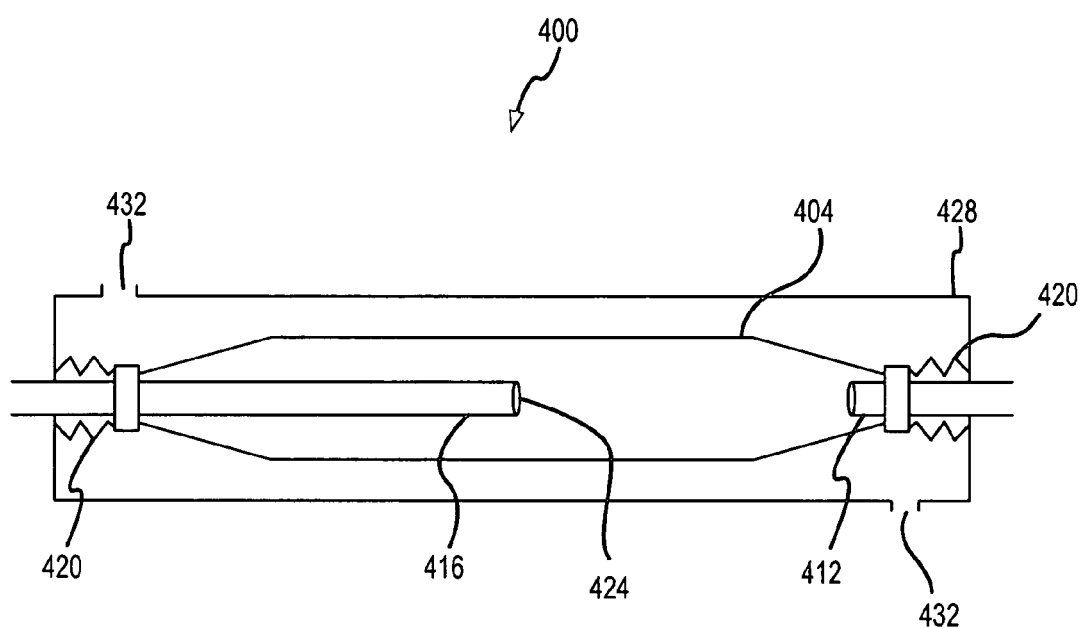
FIG. 4 is a schematic representation of an orientation insensitive gas/liquid separator in accordance with another embodiment of the present invention.

With reference now to FIG. 4, a gas/liquid separator 400 in accordance with another embodiment of the present invention is illustrated. In the separator 400, a variable reservoir volume 404 is provided by a seamless tube constructed from a gas permeable, hydrophobic, microporous material. The ends may be flattened and seam sealed. A first end of the reservoir 404 may admit an inlet tube 412, while a second end of the reservoir 404 may admit a liquid outlet tube 416. Tension springs 420 operate to pull or bias the cylindrical reservoir 404 flat. This axial tension on the reservoir 404 pressurizes any liquid present in the reservoir 404, and expels gases admitted to the reservoir 404 by the inlet 412 through the permeable walls of the reservoir 404. The liquid within the reservoir 404 is removed through the liquid outlet 416. In accordance with an embodiment of the present invention, the opening 424 of the liquid outlet 416 is positioned at or near the center of the variable reservoir volume 404, so that the separator 400 may be operated in any orientation with respect to a gravitational field, or in zero gravity conditions.

A reservoir enclosure 428 may be provided to collect gas expelled from the reservoir 404. Gas may be removed from the enclosure 428 through one or more vent ports 432. The enclosure 428 may also provide fixed points for mounting the tension springs 420.

Figure 5A:
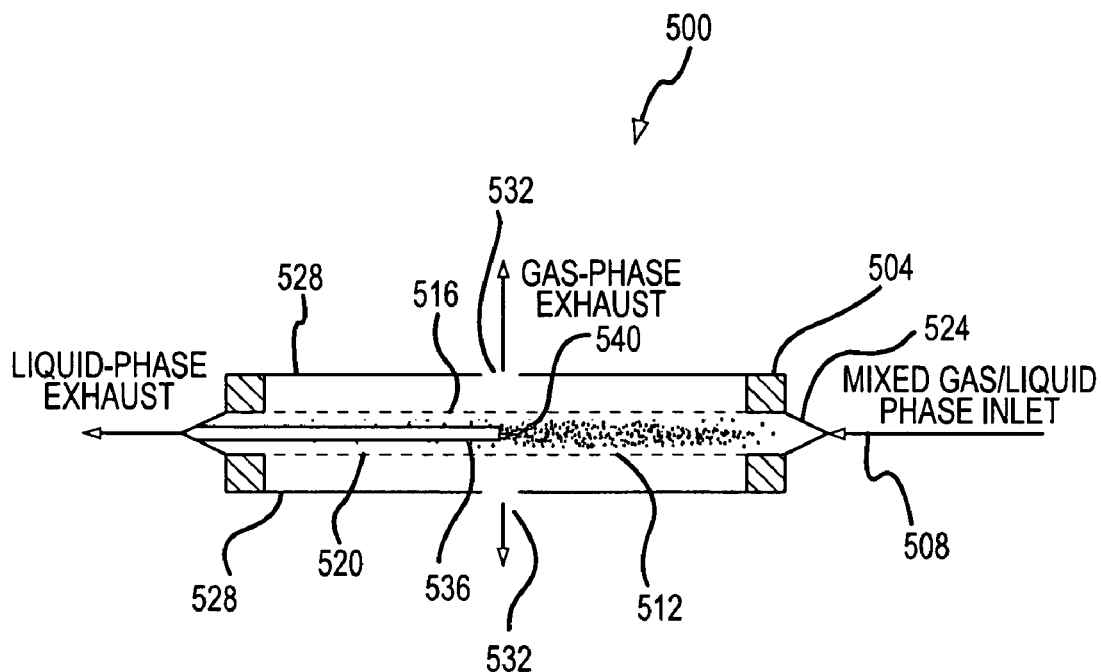
FIG. 5A is a schematic representation of an orientation insensitive gas/liquid separator in accordance with yet another embodiment of the present invention, with the reservoir providing a first volume.
Figure 5B:
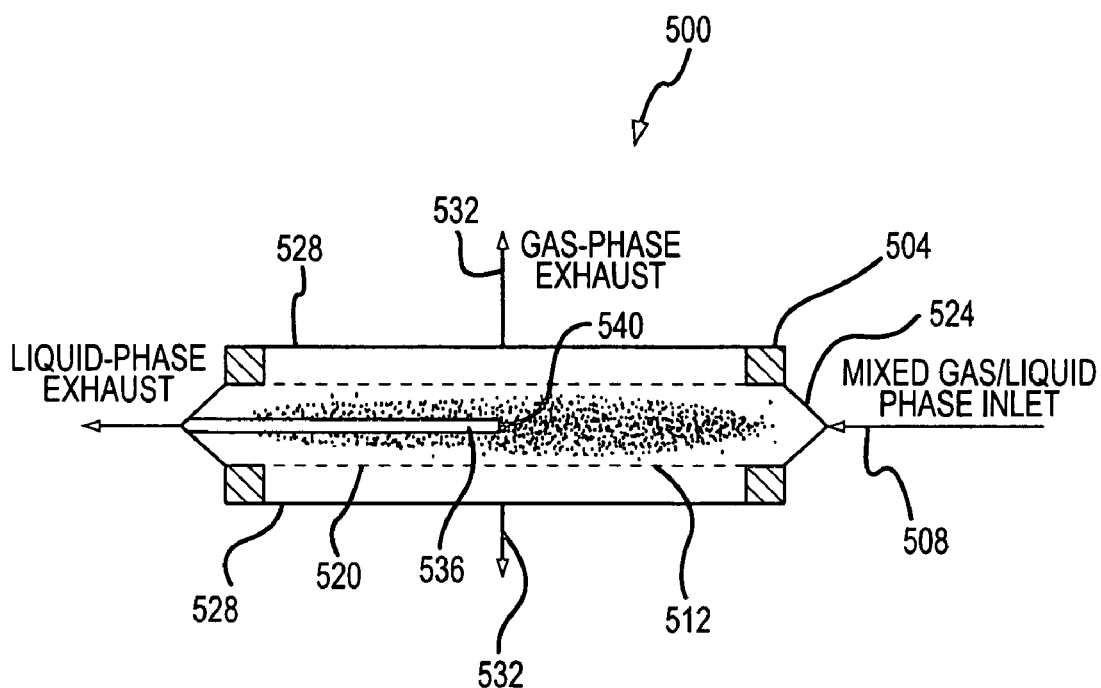
FIG. 5B is a schematic representation of the gas/liquid separator of FIG. 5A, with the reservoir providing a second volume.

With reference now to FIGS. 5A and 5B, a gas/liquid separator 500 in accordance with yet another embodiment of the present invention is illustrated. The separator 500 generally includes a reservoir module 504 that accepts a mixed phase stream of gases and liquids from an inlet 508 into a reservoir 512 having a variable volume. The reservoir 512 is bounded on a first side by a first planar, gas permeable, hydrophobic membrane 516, and on a second side by a second planar, gas permeable, hydrophobic membrane 520. The circumference or perimeter of the reservoir is bounded by a flexible bellows 524. The bellows 524 allows the volume of the reservoir 512 to be altered by changing the distance between the planar membranes 516, 520. In FIG. 5A, the reservoir 512 is shown at a first volume, with the first 516 and second 520 membranes a first distance from one another. In FIG. 5B, the reservoir 512 is illustrated at a second, larger volume, with the first 516 and second 520 planar membranes at a second, larger distance from one another.

The bellows 524 may bias the first 516 and second 520 planar membranes towards one another to pressurize the mixed phase material introduced through the inlet 508, and to expel the gas phase components of that material. Alternatively or in addition, springs may be provided for biasing the planar membranes 516, 520 towards one another Manifolds 528 may be provided to collect the stripped gases, and the gas may be removed from the manifolds 528 through outlet vents 532.

The liquid phase of the material introduced to the volume 512 is removed through a liquid outlet 536. The opening 540 of the liquid outlet 536 is positioned at about the center of the volume of the reservoir 512, so that a reliable supply of liquid is provided to the outlet 536.

Figure 6:
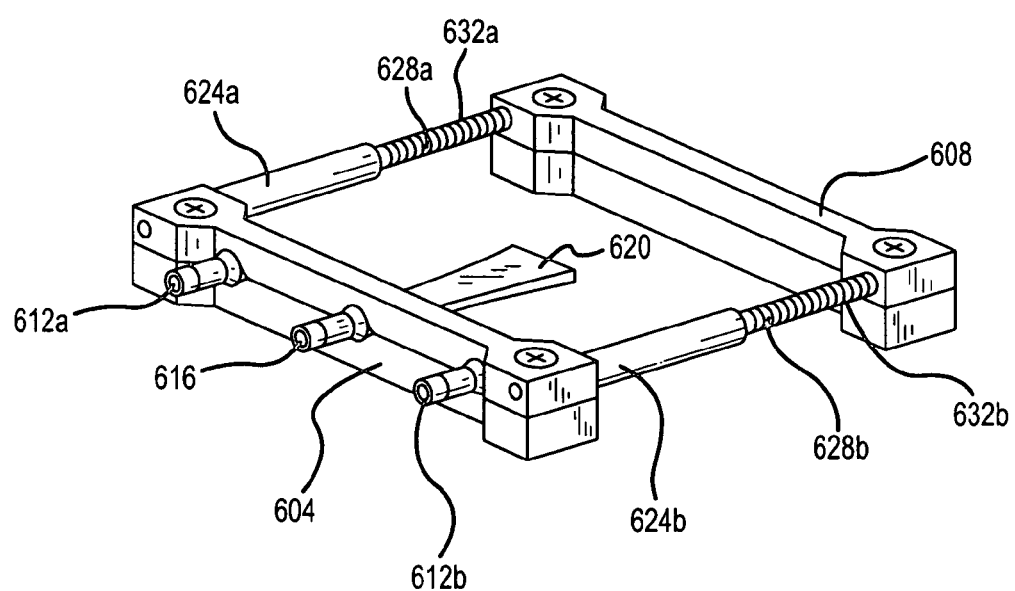
FIG. 6 is a schematic representation of components of an orientation insensitive gas/liquid separator in accordance with still another embodiment of the present invention.

With reference now to FIG. 6, components of an orientation insensitive gas/liquid separator in accordance with still another embodiment of the present invention are illustrated. In the embodiment of FIG. 6, a first membrane end or clamp assembly 604 and a second membrane end or clamp assembly 608 are provided for sealing the ends of a cylindrical reservoir having a variable volume and comprising a gas permeable membrane, such as the reservoir 404 described in connection with FIG. 4. The membrane clamp assemblies 604 and 608 may each include complimentary tongue and groove structures between their two halves for promoting sealing. As shown in FIG. 6, two inlets 612*a* and 612*b* are provided for introducing the mixed phase material to the reservoir. In addition, an outlet 616 is provided for removing liquid from the reservoir. The end 620 of the outlet 616 that is positioned within the volume of the reservoir of the complete separator assembly is flattened, to assist in keeping the end 620 surrounded by liquid phase material only. The inlets 612*a* and 612*b* and the outlet 616 may all enter the reservoir through the seam sealed by the first clamp 604. Accordingly, the first clamp 604 seals the reservoir about the inlets 612*a* and 612*b* and the outlet 616.

Hollow guide rods 624*a* and 624*b* are provided that are fixed or integral to the first membrane clamp assembly 604. The hollow guide rods 624*a* and 624*b* each receive a first end of an insert 628*a* and 628*b*. The second end of each insert 628*a* and 628*b* is fixed or integral to the second membrane clamp assembly 608. Compression springs 632*a* and 632*b* bias the second membrane clamp assembly 608 away from the first membrane clamp assembly 604.

In operation, the springs 632*a* and 632*b* tend to flatten a reservoir having ends that are clamped in the clamp assemblies 604 and 608, pressurizing the contents of the reservoir. Accordingly, the gas permeable membrane walls of the reservoir are kept in contact with the liquid held by the reservoir, while gas introduced through the inlets 612*a* and 612*b* is expelled.

Figure 7A:
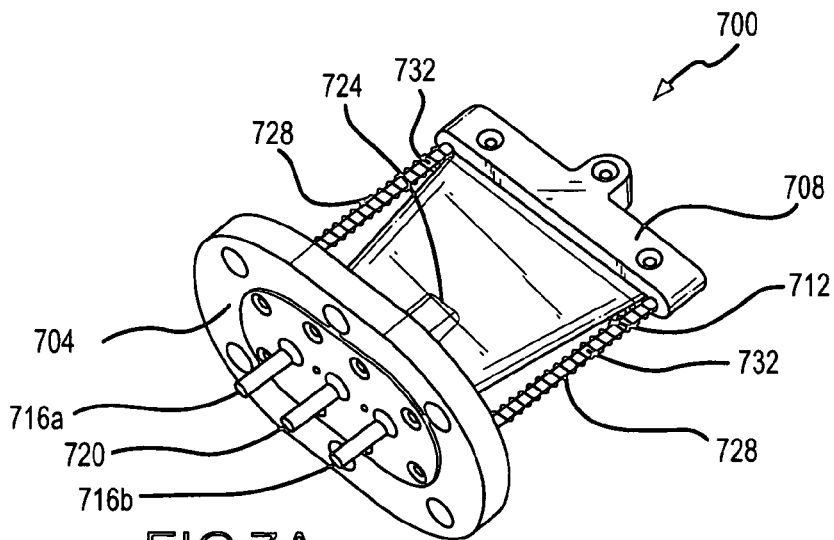
FIG. 7A is an isometric view of an orientation insensitive gas/liquid separator in accordance with still another embodiment of the present invention.
Figure 7B:
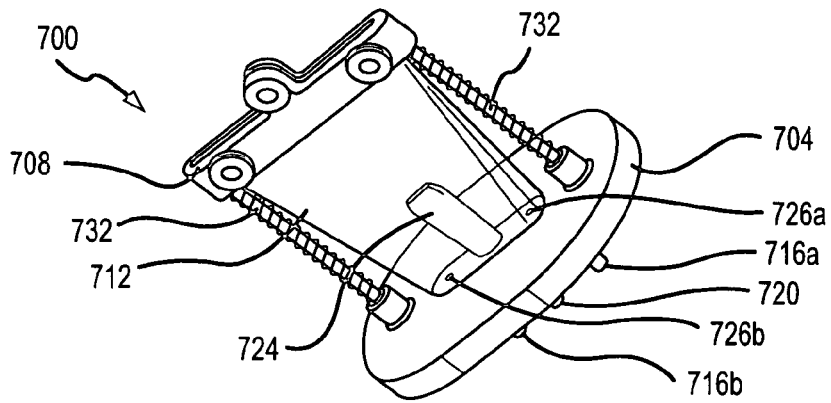
FIG. 7B is another isometric view of the orientation insensitive gas/liquid separator illustrated in FIG. 7A.

With reference now to FIGS. 7A and 7*b*, isometric views of an orientation insensitive gas/liquid separator 700 in accordance with an embodiment of the present invention are illustrated. In the embodiment illustrated in FIGS. 7A and 7B, a first membrane end assembly 704 and a second membrane end assembly 708 are provided for holding and sealing the ends of a reservoir 712. The reservoir 712 has a variable volume, and comprises a gas permeable membrane material. The reservoir 712 may be formed from a cylindrical piece of membrane material having first and second open ends that are held within the first membrane end assembly 704 and the second membrane end assembly 708, respectively, when the reservoir 712 is installed in the separator 700, sealing the ends. The membrane end assemblies 704, 708 may each include complementary tongue and groove structures to promote sealing of the ends of the reservoir 712. As shown in FIGS. 7A and 7B, two inlets 716*a* and 716*b*, both in communication with an interior of the reservoir 712, are provided. In addition, an outlet 720 is provided for removing liquid from the reservoir 712. The end or opening 724 of the outlet 720 may be flattened, to assist in keeping the opening 724 surrounded by liquid phase material only. As shown in FIGS. 7A and 7B, the inlets 716*a* and 716*b* and outlet 720 may all enter the reservoir 712 through the first end of the reservoir 712 sealed by the first end assembly 704. In addition, the opening 724 of the outlet 720 may face away from the openings 726*a* and 726*b* (see FIG. 7B) of the inlets 716*a* and 716*b*, to help prevent providing gas phase material to the outlet 720.

In the embodiment illustrated in FIGS. 7A and 7B, the second membrane end assembly 708 is biased away from the first membrane end assembly 704 by springs 728 that are each positioned around a corresponding guide rod 732. The biasing of the second membrane end assembly 708 away from the first membrane end assembly 704 tends to maintain the reservoir 712 in tension, flattening the reservoir 712 and decreasing the volume of the reservoir 712. When the separator 700 is in operation and a liquid is admitted into the interior of the reservoir 712 through the inlets 716*a* and 716*b*, for example as part of a mixed phase material, the pressure of the liquid will tend to force the sides of the reservoir 712 away from one another, increasing the volume of the reservoir 712 and drawing the first 704 and second 708 membrane end assemblies toward one another against the force of the springs 728. As can be appreciated, the force of the springs 728 will tend to maintain a pressure on the contents of the reservoir 712, promoting the removal of gas from within the reservoir 712 through the reservoir membrane.

Figure 8A:
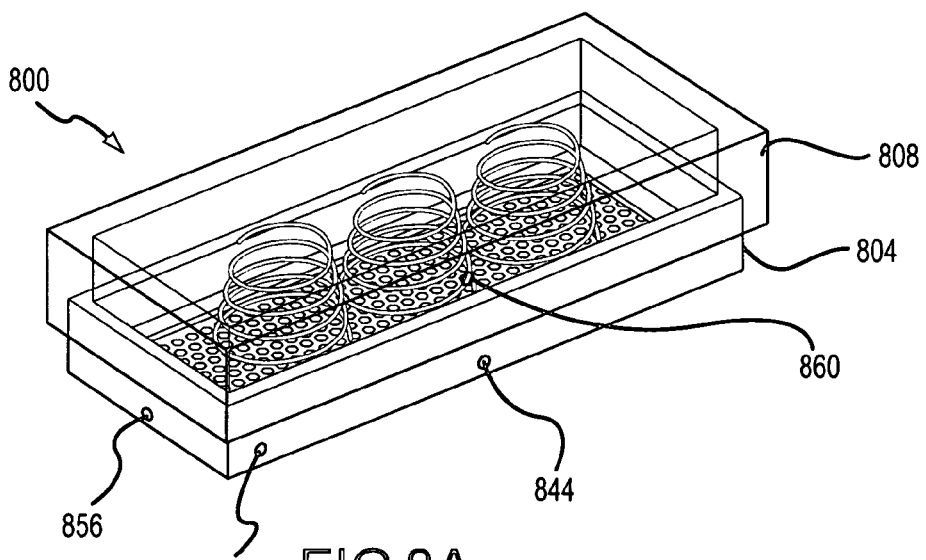
FIG. 8A depicts an orientation insensitive gas/liquid separator in accordance with an embodiment of the present invention.

With reference now to FIG. 8A, a gas/liquid separator 800 in accordance with an embodiment of the present invention is illustrated. The gas/liquid separator 800 is shown in an exploded view in FIG. 8B. The following discussion of the gas/liquid separator 800 will be made with reference to both FIGS. 8A and 8B.

Figure 8B:
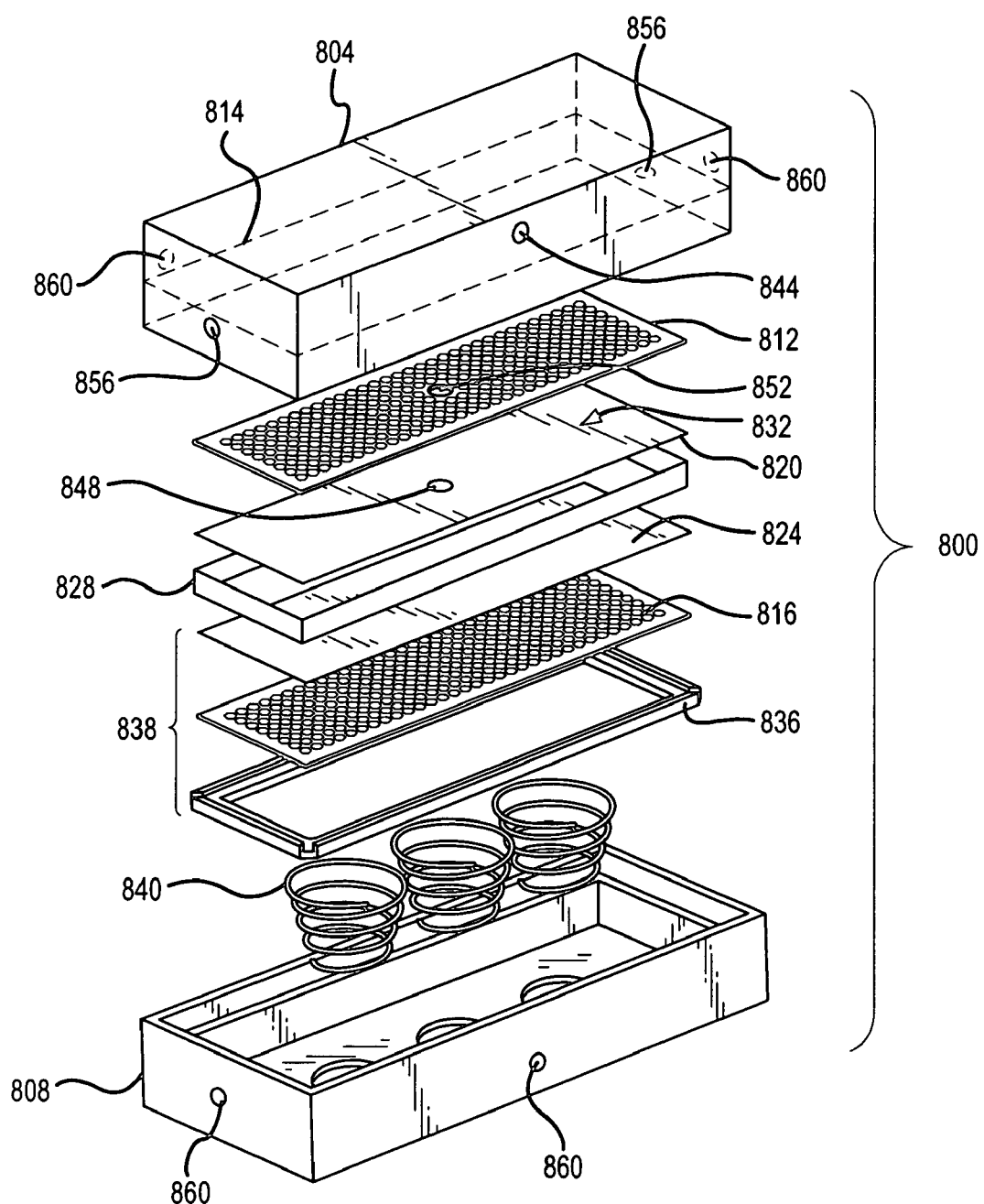
FIG. 8B is an exploded view of the gas/liquid separator illustrated in FIG. 8A.

As shown in FIGS. 5A and 8B, the gas/liquid separator 800 includes a first cover 804 and a second cover 808. When the gas/liquid separator 800 is in assembled form, the first cover 804 is fixed to the second cover 808, for example by a system of fasteners and/or an adhesive. Furthermore, the joint between the first cover 804 and the second cover 808 may be sealed to prevent the passage of liquids gases.

Contained within the first 804 and second 808 covers are first 812 and second 816 support surfaces or screens. First 820 and second 824 gas permeable membranes are positioned between the support screens 812, 816. The first screen 812 and the first membrane 820 are bonded to the inside of the first cover 804, for example within a plane denoted by dotted line 814. The second support screen 816 and the second membrane 824 are bonded to a frame 836, forming a movable structure 838. A liquid impermeable, flexible skirt or bellows 828 seals the volume between the first 820 and second 824 membranes, forming a reservoir 832. In an embodiment of the present invention, the flexible skirt 828 is bonded to the perimeter of the movable assembly 838 and to the perimeter of the second cover 808. In another embodiment of the present invention, the flexible skirt 828 is bonded to the perimeter of the movable assembly 838 and the perimeter of the first cover 804. Because the second membrane 824 is free to move with respect to the fixed first membrane 820, and because the skirt 828 is flexible and provides slack, the volume of the reservoir 832 is variable, allowing the reservoir 832 to maintain different volumes of liquid material under pressure.

The support screens 812 and 816 are designed to provide support for the corresponding membrane 820 or 824, without greatly impeding the flow of gas from the reservoir 832 through the membranes. Accordingly, the support screens 812 and 816 may be formed from a sheet of rigid material, such as stainless steel, having holes formed therein. The membranes 820 and 824, as with other embodiments of the present invention, may comprise a gas permeable, hydrophobic material, such as PTFE. The skirt may be formed from a durable, flexible material such as MYLAR or silicone.

In order to allow movement of the second membrane 824 towards or away from the first membrane 820, the movable structure 838 is free to move along an axis perpendicular to the plane of the membranes 820, 824 within the enclosure formed by the first 804 and second 808 covers. Springs 840 or other elastic members are provided between the second cover 808 and the movable structure 838 formed by the second membrane 824, the second support screen 816 and the frame 836. The springs 840 bias the movable structure 838, and thus the second membrane 824, towards the first membrane 820. Accordingly, liquid held within the reservoir 832 is pressurized by the force of the springs 840, allowing different volumes of liquid to be accommodated by the reservoir 832 under pressure.

The first screen 812 and first membrane 820 may be held in a position that is fixed with respect to the first 804 and second 808 covers. As described above, the skirt 828 seals the volume between the first membrane 820, which has a fixed position, and the second membrane 824, which is movable, forming a reservoir 832. Accordingly, the skirt 828 flexes to accommodate differences in the distance between the first 820 and second 824 membranes, and thus different reservoir 832 volumes.

An intake 844 is provided for admitting a gas/liquid phase material to the separator 800. As shown in FIGS. 8A and 8B, the intake 844 may be formed in a side of the first cover 804. The intake 844 communicates with the interior of the reservoir 832 through one or more intake holes 848 formed in the first membrane 820 and one or more through holes 852 formed in the first support screen 812. One or more liquid outlets 856, in communication with the interior of the reservoir 832, may be formed as part of the first cover 804 for removing liquid phase material from the interior of the reservoir 832. In accordance with an embodiment of the present invention, the liquid outlets 856 may comprise tubes that communicate with the interior of the reservoir 832 through an outlet hole or holes formed in the first cover 804, first membrane 820 or the skirt 828. The outlets 856 may have openings positioned at various locations around the periphery of the reservoir 832.

Because the springs 840 tend to maintain the contents of the reservoir 832 under pressure, gas phase material admitted to the reservoir 832 through the intake 844 is passed through the first 820 and/or second 824 membranes. Gas phase material that passes through the first membrane 820 enters a volume formed between the first membrane 820 and the interior of the first cover 804. Gas phase material that passes through the second membrane 824 enters a volume formed between the second membrane 824 and the second cover 808. The gas that has passed through the membranes 820, 824 is removed from the corresponding volumes through one or more gas outlets 860 formed in the first 804 and second 808 covers.

The separator 800 illustrated in FIGS. 8A and 8B provides a reservoir 832 having a variable volume. Accordingly, a variable volume of liquid phase material may be held in the reservoir 832. In addition, gas permeable membranes 820, 824 are provided so that gas phase material admitted into the reservoir 832 can be separated from the liquid. By biasing the second membrane 824 towards the first membrane 820, the liquid held within the reservoir 832 is pressurized, which assists in driving gas phase material from the interior of the reservoir 832. The separator 800 is capable of operating at any orientation with respect to gravity, or in zero gravity. In addition, the separator 800 provides structures that avoid flexing of the membranes 820, 824, which is believed to promote the reliable operation of the separator 800 and to extend the useful life of the membranes 820, 824.

Figure 9:
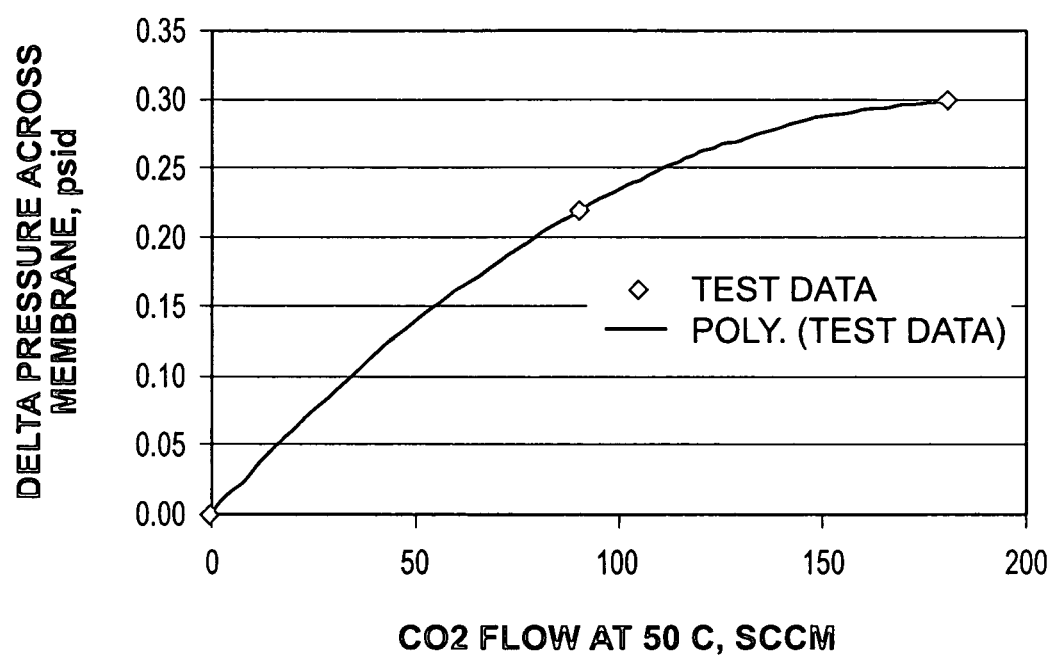
FIG. 9 is a graph depicting the gas flow performance of a gas/liquid separator in accordance with an embodiment of the present invention.

With reference now to FIG. 9, a graph depicting the gas flow performance of a gas/liquid separator in accordance with an embodiment of the present invention is shown. In particular, FIG. 9 illustrates the pressure differential measured across the membrane of a gas/liquid separator in accordance with the present invention. More particularly, the data illustrated in FIG. 9 was obtained from a gas/liquid separator according to the embodiment illustrated in FIGS. 7A and 7B having a reservoir with a width at the top clamp 708 of about 1½ inches and a length of about 1¾ inches when the second clamp 708 is a maximum distance from the first clamp 704. The data shown in FIG. 9 demonstrates that carbon dioxide gas is removed from the reservoir 712 with very little back pressure while the reservoir is filled with a water/methanol mixture of 0.5 molar methanol. Accordingly, FIG. 9 demonstrates that a gas/liquid separator in accordance with the present invention can remove gas from a mixed phase material even if the mixed phase material is introduced to a reservoir of a separator in accordance with the present invention at low pressures.

Figure 10:
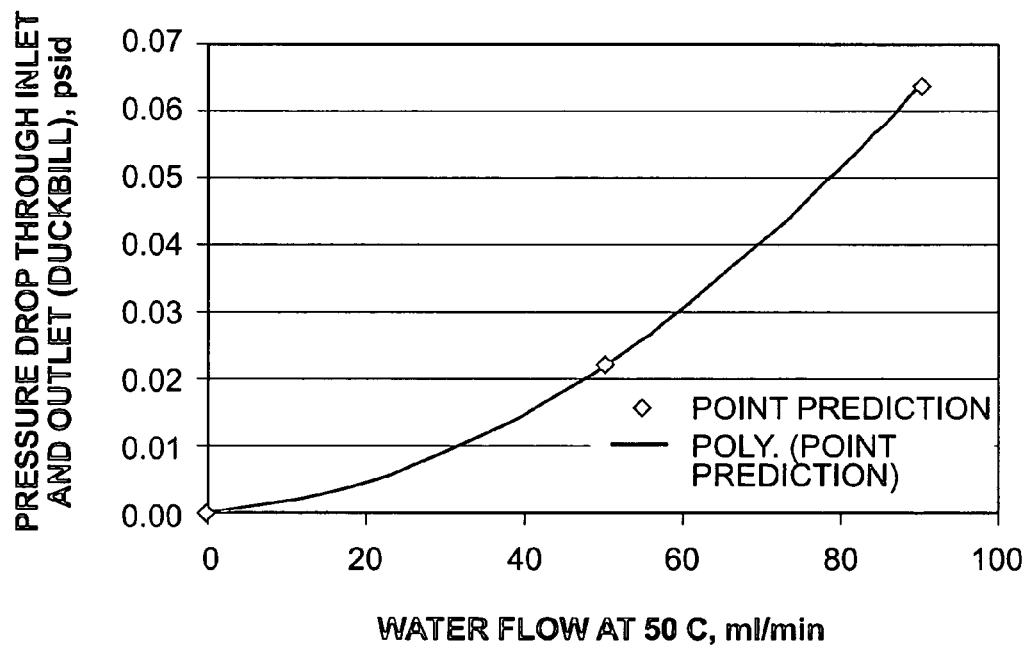
FIG. 10 is a graph depicting the liquid flow performance of a gas/liquid separator in accordance with an embodiment of the present invention.

FIG. 10 is a graph depicting the liquid flow performance of a gas/liquid separator in accordance with an embodiment of the present invention. In particular, FIG. 10 illustrates that the pressure drop between the inlet (e.g., inlets 716a and 716b) to a reservoir (e.g., reservoir 712) and an outlet (e.g., outlet 720) is low, and thus that the impedance to liquid flow through the separator is low.

Figure 11:
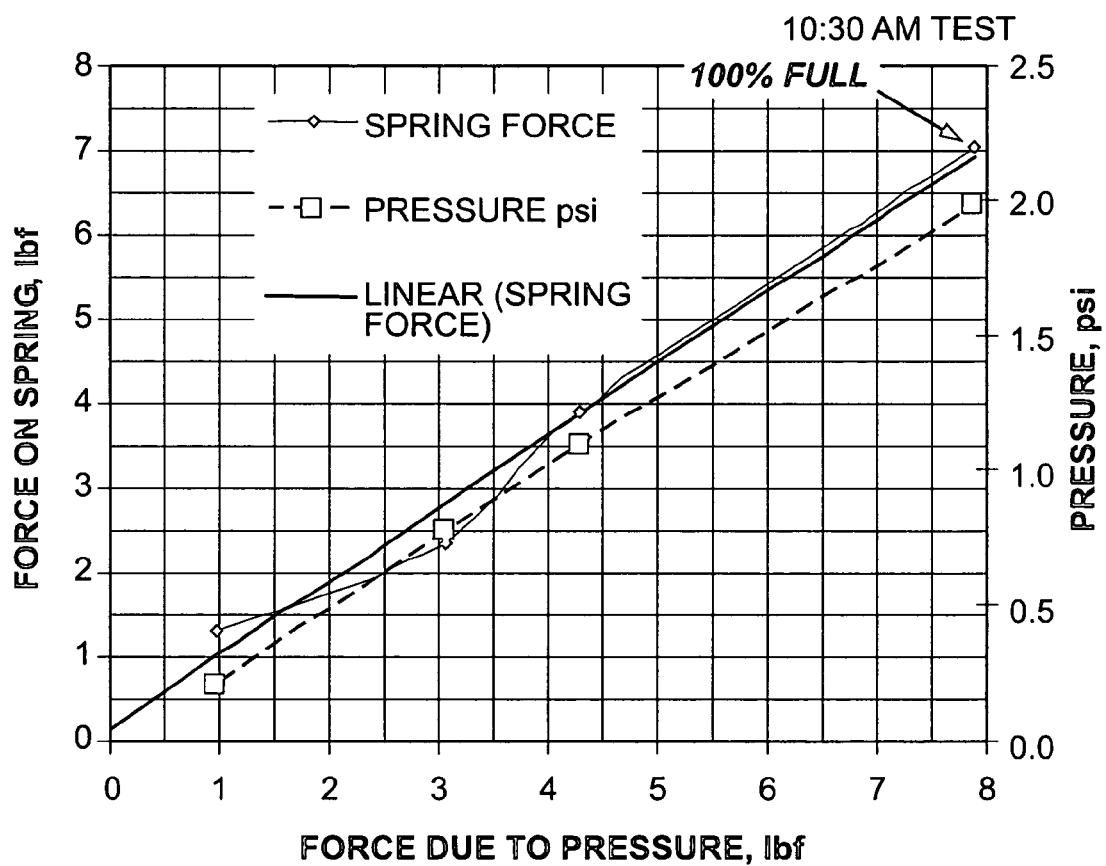
FIG. 11 is a graph depicting the relationship between pressure and volume of a liquid in a reservoir of a gas/liquid separator in accordance with an embodiment of the present invention.

FIG. 11 is a graph depicting the relationship between the pressure and the volume of a liquid in a reservoir of a gas/liquid separator in accordance with an embodiment of the present invention. In particular, FIG. 11 illustrates that the force exerted by a spring (e.g., springs 840 of the embodiment illustrated in FIGS. 8A and 8B) is linearly proportional to the volume of the reservoir (e.g., reservoir 832). As can be appreciated by one of skill in the art, because the reservoir is permeable to gas phase material, and because the resistance to gas flow through the membrane or membranes of the reservoir is low, the volume of the reservoir will tend to be almost exactly equal to the volume of liquid held in the reservoir.

Although the description set forth above discusses use of various embodiments of the present invention in connection with the recycling of material streams in a direct methanol fuel cell, the invention is not so limited. In general, the disclosed separator can be applied in connection with a wide variety of processes or apparatuses in which a gas/liquid separator is required or desired. In particular, the separator of the present invention can be used in connection with applications in which gas/liquid separation that can be performed without regard to the orientation or existence of gravitational fields is required or desired. Furthermore, the separator of the present invention can be used in connection with applications in which a gas/liquid separator having an integrated liquid reservoir is required or desired.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for separating a gas from a liquid, comprising:

separating a first volume of a gas phase of a mixed phase material stream from said material at a first orientation with respect to a gravitational field;

storing a second volume of a liquid phase of said material in a reservoir at said first orientation with respect to the gravitational field;

separating a third volume of said gas phase of said material from said material at a second orientation with respect to the gravitational field; and storing a fourth volume of said liquid phase of said material in the reservoir at said second orientation with respect to the gravitational field.

2. The method of claim 1, wherein said second and fourth volumes of said liquid phase are about equal.

3. The method of claim 1, wherein a strength of the gravitational field is about zero.

4. The method of claim 1, wherein said first and second orientations are about 90° apart.

5. The method of claim 1, wherein said separating a first volume of gas comprises:

pressurizing said mixed phase material; and passing said first volume of gas through a gas permeable membrane.

6. The method of claim 5, wherein said gas permeable membrane defines a variable membrane volume.

7. A method for separating a gas phase component from a liquid phase component of a mixed phase material, comprising:

introducing said mixed phase material to a reservoir, wherein a volume of said reservoir is variable;

removing at least a portion of said gas phase component through at least a portion of a boundary defining said reservoir; and removing at least a portion of said liquid phase component through an outlet positioned within said reservoir, wherein removing at least a portion of said liquid phase component comprises passing said portion of said liquid phase component through a hydrophilic membrane.

8. The method of claim 7, further comprising maintaining at least a first pressure within said reservoir.

9. The method of claim 7, wherein said method is performed at any of a plurality of orientations with respect to a gravitational field.

10. The method of claim 7, wherein said method is performed in a gravitational field having a strength of about zero.

11. The method of claim 7, wherein removing at least a portion of said gas comprises forcing said gas through a gas permeable membrane.

12. The method of claim 7, wherein said reservoir comprises a gas permeable membrane.

13. An orientation insensitive gas-liquid separator, comprising:

a variable volume comprising a hydrophobic membrane;

an inlet, whereby a mixed phase material is introduced to said variable volume; and an outlet in communication with an interior of said variable volume, whereby a liquid phase of said mixed phase material is removed from said variable volume through said outlet, and wherein a gas phase of said mixed phase material may be removed from said variable volume through said hydrophobic membrane;

a first membrane end assembly, wherein a first end of said variable volume is secured at said first membrane end assembly;

a second membrane end assembly, wherein a second end of said variable volume is secured at said second membrane end assembly;

a biasing member, wherein said first and second membrane end assemblies are biased away from one another.

14. The separator of claim 13, wherein at least said liquid phase of said mixed phase material within said variable volume is pressurized.

15. The separator of claim 13, wherein said liquid phase of said mixed phase material and said gas phase of said mixed phase material are separated regardless of an orientation of said separator.

16. The separator of claim 13, wherein said hydrophobic membrane comprises a polytetrafluoroethylene material.

17. The separator of claim 13, wherein said outlet has an opening that is positioned at about a center of said variable volume.

18. An orientation insensitive gas-liquid separator, comprising:

a variable volume comprising a hydrophobic membrane, wherein said variable volume is held between a fixed support surface and a movable support surface, and wherein said movable support surface is biased towards said fixed support surface;

an inlet, whereby a mixed phase material is introduced to said variable volume; and an outlet in communication with an interior of said variable volume, whereby a liquid phase of said mixed phase material is removed from said variable volume through said outlet, and wherein a gas phase of said mixed phase material may be removed from said variable volume through said hydrophobic membrane.

19. The separator of claim 18, wherein said variable volume comprises first and second planar surfaces, and wherein at least said first planar surface comprises said hydrophobic membrane, and wherein said first and second planar surfaces are biased towards one another.

20. The separator of claim 18, wherein a pressure of said liquid phase of said mixed phase material is in direct proportion to a volume of said liquid phase of said mixed phase material.

21. An orientation insensitive gas-liquid separator, comprising:

a variable volume comprising a hydrophobic membrane;

an inlet, whereby a mixed phase material is introduced to said variable volume;

an outlet in communication with an interior of said variable volume, whereby a liquid phase of said mixed phase material is removed from said variable volume through said outlet, wherein a gas phase of said mixed phase material may be removed from said variable volume through said hydrophobic membrane, and wherein said outlet comprises a hydrophilic membrane, whereby said gas phase of said mixed phase material is prevented from leaving said variable volume through said outlet.

22. An orientation insensitive gas-liquid separator, comprising:

a variable volume comprising a hydrophobic membrane;

an inlet, wherein a mixed phase material is introduced to said variable volume;

an outlet in communication with an interior of said variable volume, wherein a liquid phase of said mixed phase material is removed from said variable volume through said outlet, wherein a gas phase of said mixed phase material may be removed from said variable volume through said hydrophobic membrane; and wherein an opening of said outlet does not face an opening of said inlet.

23. An apparatus for separating a gas component of a mixed phase material from a liquid component of the mixed phase material, comprising:
- means for containing a liquid and releasing a gas;
- means for pressurizing a contents of said means for containing;
- means for introducing a mixed phase material to said means for containing; and
- means for removing the liquid from said means for containing, wherein said means for removing the liquid from said means for containing comprises a hydrophilic membrane.

24. The apparatus of claim 23, wherein said means for containing comprises a gas permeable membrane.

* * * * *